US010746643B1

(12) United States Patent
Bentley

(10) Patent No.: US 10,746,643 B1
(45) Date of Patent: Aug. 18, 2020

(54) AUTO-CALIBRATING DROP IMPACT SENSOR

(71) Applicant: Anthony Earl Bentley, Tijeras, NM (US)

(72) Inventor: Anthony Earl Bentley, Tijeras, NM (US)

( * ) Notice: Subject to any disclaimer, the term of this patent is extended or adjusted under 35 U.S.C. 154(b) by 246 days.

(21) Appl. No.: 15/948,002

(22) Filed: Apr. 9, 2018

Related U.S. Application Data

(60) Provisional application No. 62/483,200, filed on Apr. 7, 2017.

(51) Int. Cl.
| | | |
|---|---|---|
| *G01N 3/62* | (2006.01) |
| *G01N 3/48* | (2006.01) |
| *G01N 3/303* | (2006.01) |
| *G01P 15/18* | (2013.01) |

(52) U.S. Cl.
CPC ............... *G01N 3/62* (2013.01); *G01N 3/303* (2013.01); *G01N 3/48* (2013.01); *G01N 2203/008* (2013.01); *G01N 2203/0676* (2013.01); *G01P 15/18* (2013.01)

(58) Field of Classification Search
CPC ............. G01N 3/48; G01N 2203/0033; G01N 2203/0676; G01N 3/30; G01N 3/40; G01P 15/00; G01P 15/18
See application file for complete search history.

(56) References Cited

U.S. PATENT DOCUMENTS

| | | | | |
|---|---|---|---|---|
| 161,737 | A * | 4/1875 | Beardslee | G01N 3/30 |
| | | | | 73/844 |
| 3,380,294 | A * | 4/1968 | Redmond | B64G 1/66 |
| | | | | 73/82 |
| 3,426,578 | A * | 2/1969 | Bergs | G01N 3/303 |
| | | | | 73/12.06 |

(Continued)

FOREIGN PATENT DOCUMENTS

WO    2015171649 A1    11/2015

OTHER PUBLICATIONS

"Triax 2015 Wireless Surface Impact Tester User's Manual Version 0.0", Alpha Automation, Inc., Oct. 10, 2015. (Year: 2015).*

(Continued)

*Primary Examiner* — David A. Rogers
(74) *Attorney, Agent, or Firm* — Rod D. Baker

(57) ABSTRACT

A method and apparatus for improving the accuracy and precision of drop impact sensing data utilized for testing the impact-absorbing capacities of surfaces, especially playground surfaces used by children, for compliance with relevant standards. A head form missile is equipped with onboard sets of high-g and low-g accelerometers for timing a period of free-fall of the missile, as well as for measuring acceleration due to impact at the end of the fall. Optimized results are obtained in a preferred embodiment by exploiting at least four accelerometers. Three of the accelerometers are sized for "high-g" measurements in each axis (X-, Y-, and Z-axes). At least one "low-g" accelerometer for (measuring (Continued)

in the Z-axis), or three accelerometers sized for "low-g" measurements in all axis (X-, Y- and Z-axes) are employed. Accelerometer readings obtained during the "zero g" free-fall period is used to cancel bias drift on all accelerometers.

14 Claims, 7 Drawing Sheets

(56) References Cited

U.S. PATENT DOCUMENTS

| | | | | |
|---|---|---|---|---|
| 4,372,162 | A * | 2/1983 | Shutt | G01P 15/125 318/651 |
| 4,531,400 | A * | 7/1985 | Nevel | G01N 3/303 73/12.13 |
| 4,640,120 | A * | 2/1987 | Garritano | G01N 3/303 73/12.13 |
| 4,856,318 | A | 8/1989 | Hogan et al. | |
| 5,390,535 | A | 2/1995 | Smock et al. | |
| 5,490,411 | A | 2/1996 | Hogan | |
| 5,714,263 | A | 2/1998 | Jakubisin et al. | |
| 5,736,631 | A * | 4/1998 | Dixon | G01N 3/307 73/12.06 |
| 5,824,880 | A * | 10/1998 | Burwell | G01N 3/303 73/12.06 |
| 5,841,019 | A * | 11/1998 | Drabrin | G01M 7/08 73/12.11 |
| 5,978,972 | A * | 11/1999 | Stewart | A42B 3/046 2/422 |
| 6,508,103 | B1 * | 1/2003 | Shim | G01N 3/30 73/12.06 |
| 6,807,841 | B1 * | 10/2004 | Chen | G01N 3/303 73/12.06 |
| 6,871,525 | B2 * | 3/2005 | Withnall | G01N 3/32 73/12.14 |
| 6,925,858 | B2 * | 8/2005 | Miles | G01N 3/303 73/12.06 |
| 6,990,845 | B2 * | 1/2006 | Voon | G01N 3/48 73/12.14 |
| 7,243,526 | B2 * | 7/2007 | Pringle | G01N 3/48 73/12.09 |
| 7,487,661 | B2 * | 2/2009 | Ueda | G01P 15/0891 360/75 |
| 7,793,544 | B2 * | 9/2010 | Merassi | G01P 15/0891 360/75 |
| 8,117,912 | B2 * | 2/2012 | Kawakubo | G01C 19/56 73/504.03 |
| 8,448,492 | B2 * | 5/2013 | Subert | E02D 1/02 73/12.06 |
| 8,718,963 | B2 * | 5/2014 | An | G01P 15/008 702/104 |
| 9,222,866 | B2 * | 12/2015 | Cline | G01N 3/303 |
| 9,568,407 | B2 | 2/2017 | Pittam et al. | |
| 2009/0312154 | A1 | 12/2009 | Harris | |
| 2013/0055797 | A1 * | 3/2013 | Cline | G01N 3/303 73/82 |
| 2016/0279502 | A1 * | 9/2016 | Brandt | G01N 3/30 |

OTHER PUBLICATIONS

"The FreeFall", website for the ParkLab, Apr. 17, 2015. (Year: 2015).*

YouTube video on the use of the Frefall Impact Testing Device from the Parklab, available on the internet at https://www.youtube.com/watch?v=IEYr616dNnY which published on Oct. 30, 2014. (Year: 2014).*

ASTM International, "Standard Specification for Impact Attenuation of Surfacing Materials Within the Use Zone of Playground Equipment"; Designation F1292-13; 2013; pp. 1-24; ASTM Int'l, West Conshohocken, PA, USA.

ASTM International, "Standard Specification for Impact Attenuation of Surfacing Materials Within the Use Zone of Playground Equipment"; Designation F1292-17a (revised as redlined); 2017; pp. 1-28; ASTM Int'l, West Conshohocken, PA, USA.

ASTM International, "Standard Specification for Impact Attenuation of Surfacing Materials Within the Use Zone of Playground Equipment"; Designation F1292-18; 2018; pp. 1-14; ASTM Int'l, West Conshohocken, PA, USA.

* cited by examiner

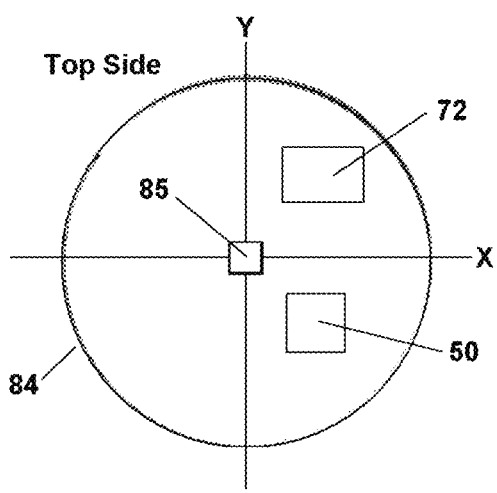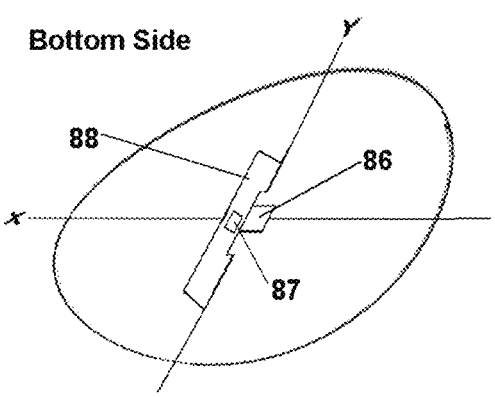
Fig. 5A     Fig. 5B
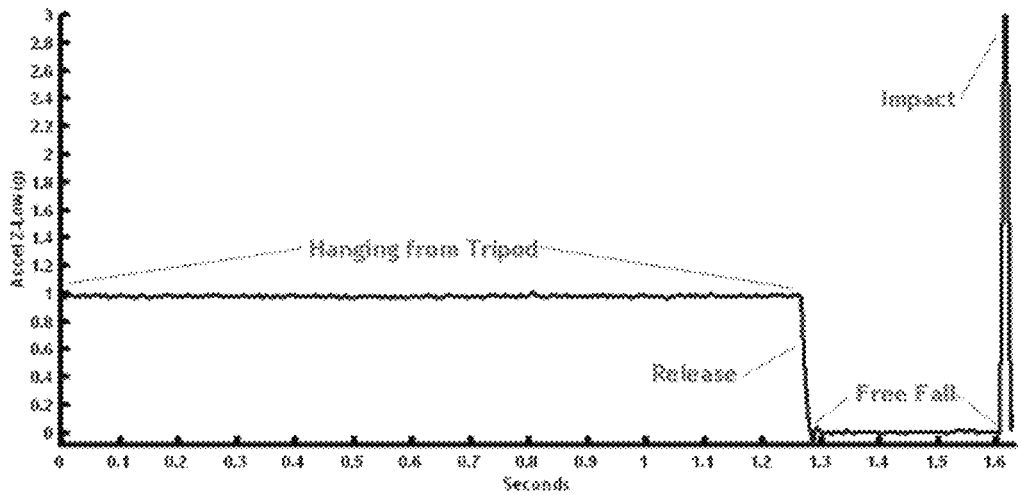
Fig. 6
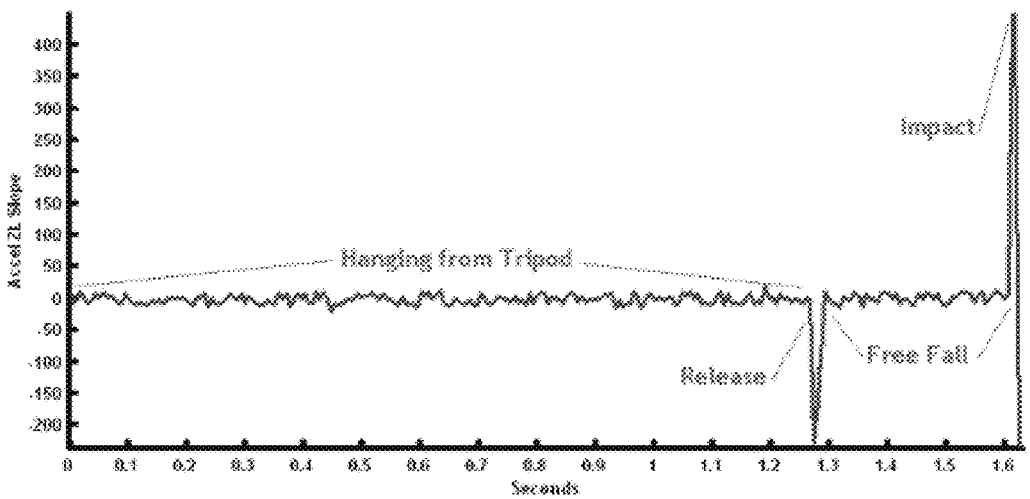
Fig. 7

AUTO-CALIBRATING DROP IMPACT SENSOR

CROSS-REFERENCE TO RELATED APPLICATIONS

This application claims the benefit of the filing of U.S. Provisional Patent Application Ser. No. 62/438,200 entitled "Auto-calibrating Drop Impact Sensor" filed on 7 Apr. 2017, the entire disclosure of which is incorporated herein by reference.

BACKGROUND OF THE INVENTION

Field of the Invention

The present invention relates generally to systems and methods for determining the resiliency or hardness of a surface. More particularly, the invention relates to an apparatus and method for accurately evaluating the impact attenuation of a playground surface. Most specifically, there is disclosed an auto- or self-calibrating apparatus for testing the effectiveness of a playground or other surface to prevent or reduce injuries due to impact with the surface, and methods and system pertaining thereto.

Background of the Invention

Falls from playground equipment are a significant cause of injuries to children. Impact-attenuating surface materials in playgrounds help reduce the risk of fall-related injuries. Specialized drop sensors have been developed to measure the effectiveness of playground surface materials used to help protect children at play. The specifications for such devices are defined in standards documents made available by the American Section of the International Association for Testing Materials: ASTM F1292-13 ("Standard Specification for Impact Attenuation of Surfacing Materials Within the Use Zone of Playground Equipment") and, more recently, ASTM F1292-17a ("Standard Specification for Impact Attenuation of Surfacing Materials Within the Use Zone of Playground Equipment"). These standards specify the testing method to quantify impact in terms of g-max and Head Injury Criterion (HIC) scores. "G-max" is the measure of the maximum acceleration (shock) produced by an impact. The Head Injury Criterion or HIC score is a measure of impact severity based on research to quantify the relationship between the magnitude and duration of impact accelerations and the risk of head trauma.

Severe head injuries are the most frequent cause of death in playground related falls. Therefore, the ASTM standards specify that the impact tester is shaped as a hemispherical "head form" missile of radius 3.15 inches, weighing 10.14 lbs., such as shown in FIG. 1. As seen in FIG. 1, and according to convention, the impact tester's head form missile has an Z-axis that, ideally, is vertical to the Earth's surface (i.e., substantially aligned with gravity vector) during the operation (falling movement) of the impact tester. The Z-axis is normal to a missile reference plane containing the X-axis and Y-axis which are perpendicular. Movement/acceleration of the impact tester due to gravity is measured with respect to the Z-axis. Thus, lateral (as distinguished from vertical) movement/acceleration of the impact tester while it falls toward the Earth are in the X- and/or Y-axis direction(s), according to well-known concepts of Cartesian coordinate systems. The gross structure of the head form missile according to the present invention is physically configured according to the dictates of the appropriate one of the aforementioned ASTM descriptions.

According to current convention, a three-axis accelerometer is attached near the center of gravity of the "head form missile," and the missile is dropped to the playground surface from the highest point on the play structure. The resulting impact is detected and recorded in all three axes at a rate of 20,000 samples per second, and then combined in a root-sum-square fashion to define a deceleration curve to quantify the magnitude and duration of the impact forces. The resulting deceleration curve, A(t), is then used in known methods to calculate the HIC score. If drop tests from the highest point on the playground down to the surface produce a g-max deceleration force of greater than 200 g's or a HIC score of greater than 1000, the playground configuration is considered unsafe. (The "g" referred to is, of course, the acceleration of gravity.) The deceleration due to impact is calculated according to the formula:

$$\text{Impact Force} = A(t) = \sqrt{A_x^2 + A_y^2 + A_z^2}$$

A generic example of an actual drop test with g-max and HIC Scores is shown in FIG. 2.

BACKGROUND ART

Drop impact sensor devices are disclosed in U.S. Pat. No. 4,856,318 to Hogan et al. and in U.S. Pat. No. 5,490,411 to Hogan. The devices of the Hogan disclosures require a three-axis accelerometer to collect deceleration data in all three orthogonal directions, and combine the data in a root-mean-square fashion to measure the total acceleration and angle of impact.

U.S. Pat. No. 5,390,535 to Smock et al. discloses a drop sensor including a "Vertically extending guide element [to] guide and maintain the drop module in a constant attitude from release until surface impact." The guide element is supposed to eliminate the need for a three-axis sensor, because all deceleration is directed solely onto the Z-axis. This simplifies the electronics and deceleration calculations, but it complicates the testing procedure for the end user; the user must transport an unwieldy support and guide mechanism to every test site. Furthermore, Smock's technique introduces error into the deceleration measurement because the guide element inevitably introduces an element of friction that slows the impact tester as it falls towards the playground surface.

U.S. Pat. No. 9,568,407 to Pittam et al. discloses a device like those taught by Hogan et al., but purports to improve thereon by adding "real time" wireless data transmission from the drop sensor to a hand-held computing device, transmitting and storing the data on the internet, and purportedly making the sensor insensitive to drop angle. Because Pittam's device sensor is supposed to be insensitive to drop angle, all three acceleration axes of the sensor must be "sized" to measure accelerations of ±250 g's in all three axes. This results in a sensor that is four times less sensitive in the X- and Y-axes, compared to the drop sensor apparatus and method disclosed herein. The disclosure of U.S. Pat. No. 9,568,407 is incorporated herein by reference.

BRIEF SUMMARY OF A PREFERRED EMBODIMENT

There is disclosed a system, apparatus, and method for improving the accuracy and precision of measuring and providing to a user drop impact sensing data utilized for testing the impact-absorbing capacities of surfaces, especially but not limited to playground ground or floor surfaces used by children, for compliance with relevant standards. A head form missile is equipped with onboard sets of both high-g and low-g accelerometers for timing a period of free-fall of the head form missile, as well as detecting and measuring acceleration due to impact at the end of the fall.

By combining the data from at least four accelerometers, the invention realizes improved accuracy. Optimized results are obtained in a preferred embodiment of the present invention by exploiting six accelerometers. Preferably, three of the accelerometers are sized for "high-g" measurements in each axis (X-, Y-, and Z-axes). At least one "low-g" accelerometer (measuring in the Z-axis), or three additional accelerometers are sized for "low-g" measurements in each axis (X-, Y- and Z-axes). The low-g Z-axis measurement is used for measuring the head form missile's fall height, and more especially is used for canceling out bias drift on all accelerometers and/or their associated electronics (such as anti-alias filters).

BRIEF DESCRIPTION OF THE SEVERAL VIEWS OF THE DRAWINGS

The accompanying drawings, which are incorporated into and form a part of the specification, illustrate several embodiments of the presently claimed invention and, together with the description, explain the principles of the presently claimed invention. The drawings are only for the purpose of illustrating a preferred embodiment of the presently claimed invention and are not to be construed as limiting the presently claimed invention. In the drawings:

FIG. 5A is a diagrammatic top plan view of a circuit board according to the present invention, and showing selected elements of the invention mounted thereon;

FIG. 5B is a diagrammatic perspective view of the underside, or bottom, of the circuit board shown in FIG. 5A, and showing other selected elements of the invention mounted thereon;

FIG. 6 is a graph of example data from a low-g Z-axis accelerometer for a three-foot drop sample test using a Head Form Missile specified in ASTM F1292-13 (time in seconds on the domain, acceleration in g's in the range);

FIG. 7 is a graph of an example of acceleration slope data from a low-g Z-axis accelerometer for a three-foot sample drop test (time in seconds on the domain, Z-axis slope in the domain);

DETAILED DESCRIPTION OF THE INVENTION

Figure 1:
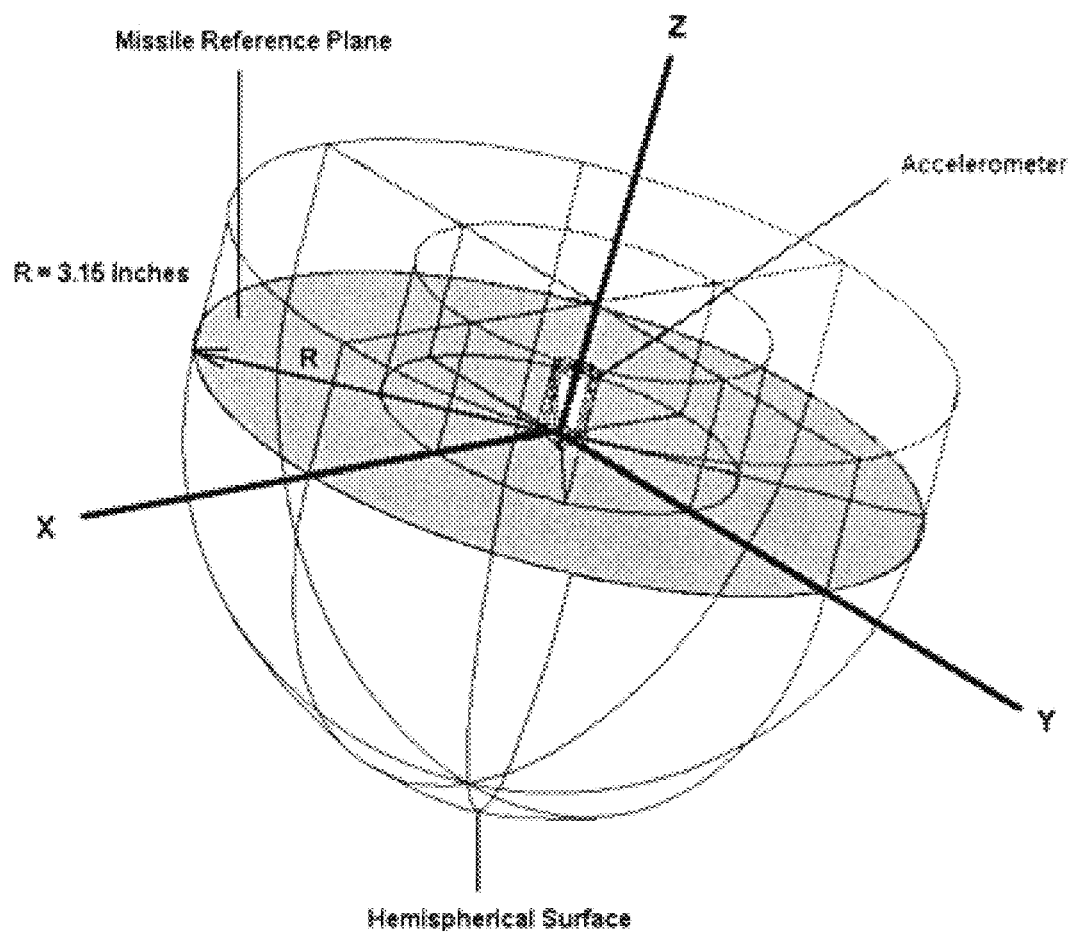
FIG. 1 is a perspective diagrammatic view of head form drop sensor apparatus illustrating general features and axes therefore.
Figure 2:
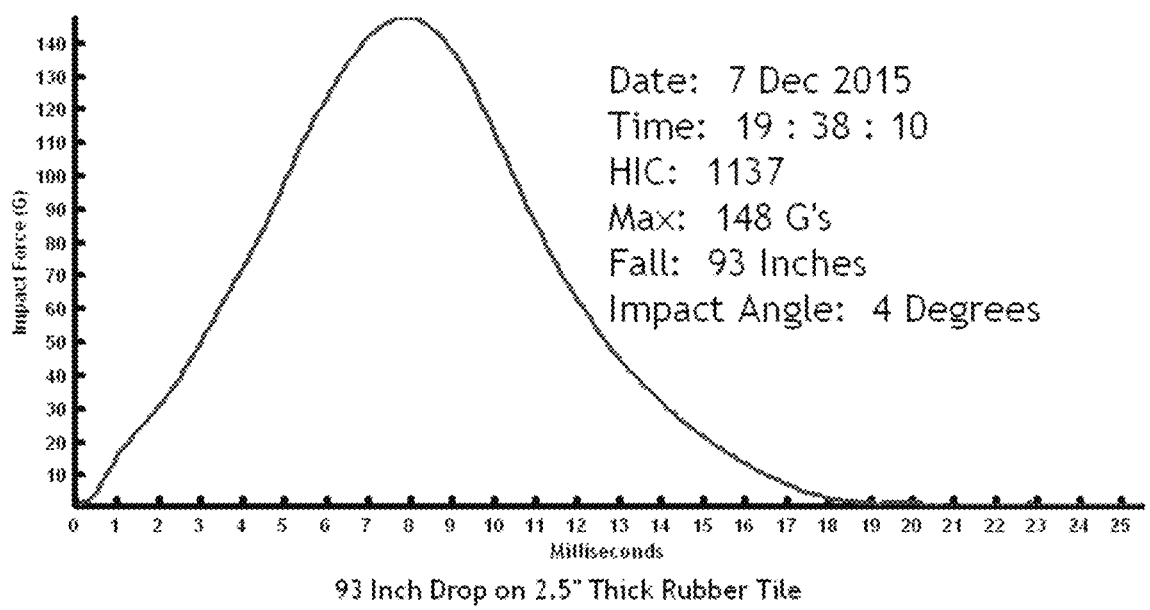
FIG. 2 is a graph of example data from a sample drop test using a "Head Form Missile" specified in ASTM F1292-13 (time in milliseconds on the domain, and impact force in g's in the range)
Figure 3:
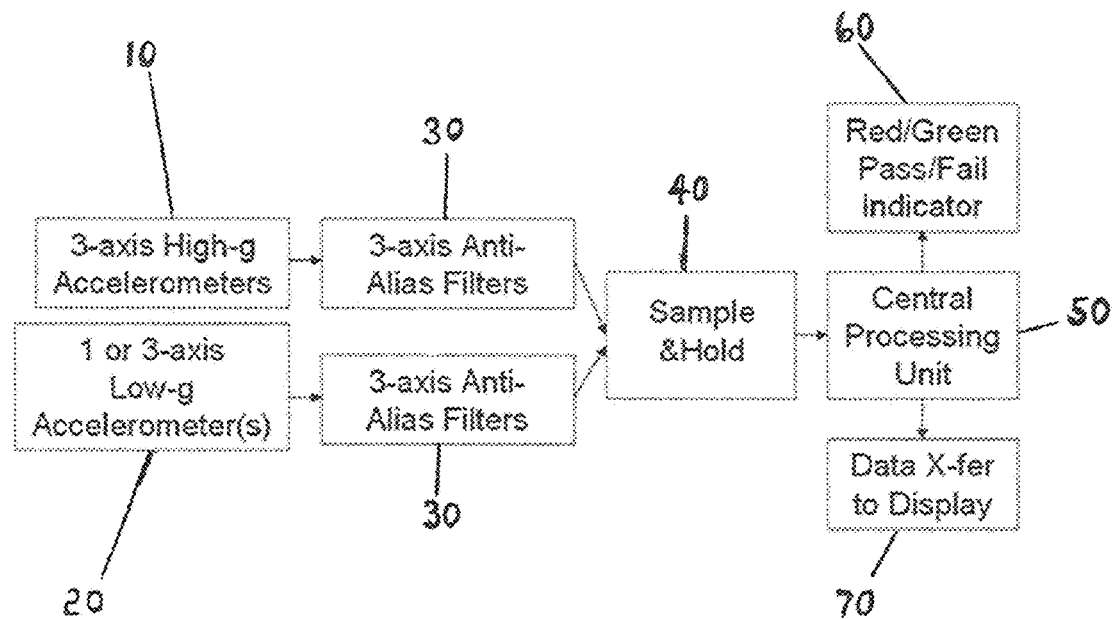
FIG. 3 is a flow chart and block diagram illustrating elements of a drop sensor according to the present invention.

There is disclosed hereby an apparatus and method for drop impact sensing/detecting that provide a significant improvement, in both accuracy and precision, over known systems and methods. FIG. 3 illustrates schematically the basic elements and dataflow of the presently disclosed apparatus and methodology. Disposed and operating on a head form missile housing (e.g., generally as illustrated in FIG. 1) configured in compliance with the ASTM standards (ASTM F1292-13 or ASTM F1292-17a) are three High-g accelerometers in the X, Y, and Z axes 10, one-axis (or preferably three-axis) Low-g accelerometers 20, anti-alias filters 30, a sample and hold circuit 40, a central processing unit (CPU) 50, a pass/fail indicator 60, and any suitable means for transferring data to a display 70. The High-g accelerometers 10, Low-g accelerometers 20, anti-alias filters 30, a sample and hold circuit 40 are on-board the missile 80. The CPU 50, a pass/fail indicator 60, and display 70 may be on-board the missile 80 or disposed remotely and separately, but in signal (wired or wireless) communication with the on-board components.

Figures 4A, 4B:
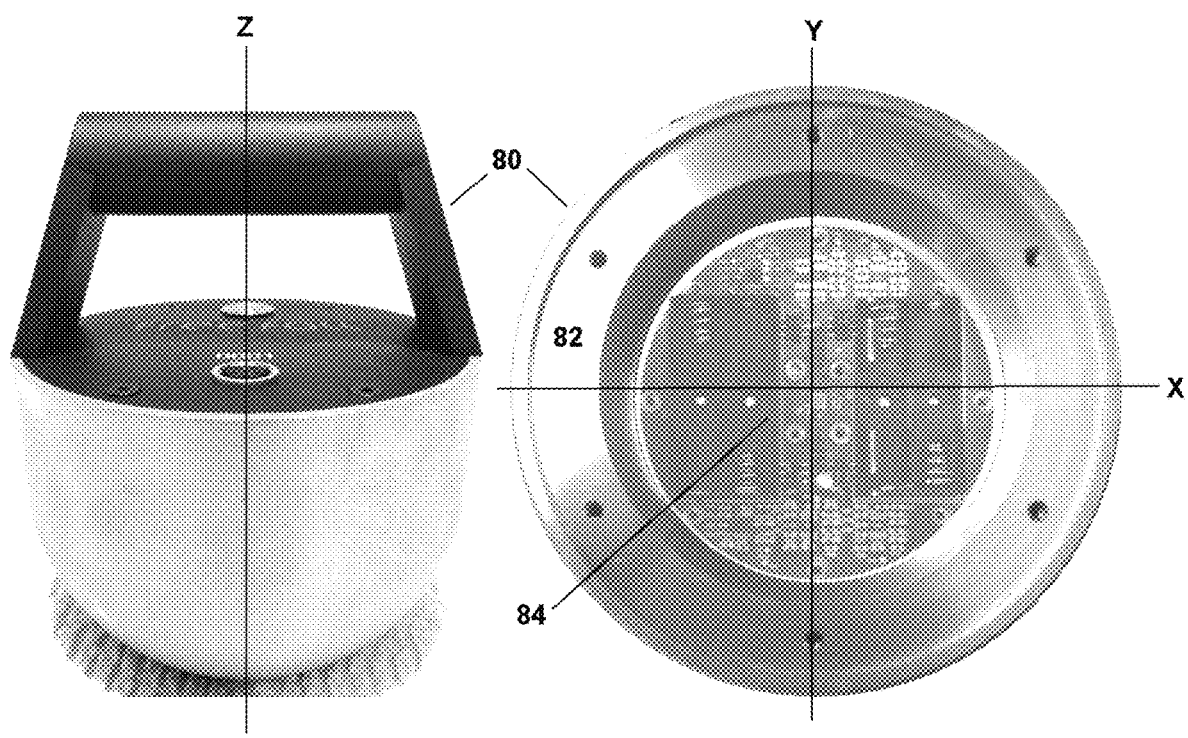
FIG. 4A is a perspective view of a head form missile apparatus according to the present invention.
FIG. 4B is a sectional plan view of an apparatus according to FIG. 4A, showing selected components, including a circuit board, internal to the apparatus.

Attention is invited to FIGS. 4A and 4B, simply depicting the head form missile 80. The head form missile housing 82 preferably is a hemisphere of lightweight metal, with a cavity located near the center of mass to contain the accelerometers and associated electronics, and devised in any suitable fashion so to permit access to its interior. The complete head form missile when assembled for use has the lower hemispherical portion that impacts the ground, and its closed top portion preferably is equipped with a rounded handle that may be comfortably gripped in the hand of a user, as seen in FIG. 4A. The handle may extend from one side of the missile to the other, such that the completed apparatus may have a basket-like appearance (except that the top plane is closed to cover the contents of the lower hemispherical portion). Reference may be made to U.S. Pat. No. 9,568,407 and the ASTM standards for background information regarding possible compositions and configurations of an appropriate missile housing 82. FIG. 4B is a plan view of the lower portion of the missile 80 with the handle and top portion removed, and showing the disposition of the circuit board 84.

Removably secured on or within the housing 82 is an electronics board 84 mounting functional components of the apparatus, including but not limited to the three-axis High-g accelerometers 10 (FIG. 3), one- or three-axis Low-g accelerometers 20 (FIG. 3), and anti-alias filters 30 (FIG. 3). The board 84 and the accelerometer sensors thereon are located very near the center of mass of the head form missile 80. A very preferred embodiment would have all three axes integrated into a single microchip for both the high-g and low-g sensors.

The apparatus thus employs sensors for detecting and measuring acceleration, both high-g and low-g (as explained further herein), relative to the X-, Y-, and Z-axes, of the head form missile 80 during a test drop. Hereinafter, "high g" when referring to an accelerometer sensor means an accelerometer configured ("sized") for detecting and measuring maxim accelerations in the range of approximately −210 g to approximately −250 g for the Z-axis and approximately ±40 g to approximately ±70 g for the X- and Y-axes. "Low g" accelerometers are sized to detect and measure accelerations in the range of approximately ±5 g to approximately ±20 g. FIG. 5 is an enlarged perspective view of the board 84, illustrating a possible placement of selected elements of the apparatus upon the board. The circuit board 84 is rigidly attached within the missile 80 by any suitable means. One or more replaceable rechargeable batteries (not shown) onboard the missile 80 supply power (voltage) to the circuit board and associated electronics, including the various accelerometer sensors. Suitable batteries are readily available, and may be, for example only, 1.2-volt "AA" size rechargeable Nickel Metal-Hydride (NiMH) power cells. The battery is removable for replacement as needed, are secured within the missile interior during the use of the apparatus.

The sensors are co-located at the approximate center of mass of the test missile 80. Referring particularly to FIG. 5, an X-High-g and Y-High-g sensor 85 preferably is attached on the top portion of the circuit board 84, at or near the missile's center of mass. (The intersection of the X- and Y-axes noted in FIG. 5). In one possible embodiment, the sensor 85 includes at least a high-g accelerometer for measuring acceleration in the X-axis, and a high-g accelerometer for measuring acceleration in the Y-axis. An X-Low-g, Y-Low-g, and Z-Low-g sensor 86 preferably (but not necessarily) is located directly underneath the X-High-g and Y-High-g sensor 85, on the bottom side of the circuit board 84. Sensor 86 thus preferably includes a low-g accelerometer for measuring acceleration in the X-axis, a low-g accelerometer for measuring acceleration in the Y-axis, and a low-g accelerometer for measuring acceleration in the vertical or Z-axis. A Z-axis High-g sensor 87 (containing a high-g accelerometer for measuring acceleration in the Z-axis) may be attached to a rigid fin member 88 connected to the bottom side of the board 84 and extending perpendicularly therefrom, as suggested in FIG. 5, to better orient the sensor in the apparatus and relative to gravity. (These locational relationships could be reversed with sensor 85 attached to the bottom of the board 84, and other sensors 86, 87 situated on the other side of the board.) The location of sensors on both the bottom and the top sides of the board 84 facilitates the placement of multiple sensors very near the missile's center of mass. The CPU 50 may also be affixed to the board 84, as well as a transmitter 72 for communicating collected data to a receiver (not shown) located remotely from the missile 80. The receiver may then communicate data for display on a suitable display 70. Accordingly, the display 70 may be a liquid crystal display, LED display, or any other similar suitable means for displaying to a user the processed data. It is understood that data from the sensors may be transferred to a small display 70 on-board the missile 80. Processed data may be stored and then disclosed by an on-board display, or alternatively (or redundantly) transmitted to a suitable conventional display (e.g., flat screen monitor) physically apart from the missile 80.

These functional components 50, 72, 85, 86, 87, are in signal communication with one another according to principles known in the art and as indicated generally by FIG. 3. The plurality of sensors 85, 86, 87 are in communication with the CPU 50. By way of example and not limitation, sensors made by and available from Analog Devices, Inc., may be used in the apparatus. The Z-High-g sensor 87 may be Analog Devices Item No. AD22283 (formerly ADXL193). The X-High-g and Y-High-g sensor 85 may be Item No. AD22284 (formerly ADXL278). The X-Low-g, Y-Low-g, Z-Low-g sensor 86 may be Item No. ADXL325 (good), or ADXL326 (better), or MXR9150GM (best).

Two sensor microchips could be employed in an alternative embodiment of the apparatus. For example, the X-Low-g, Y-Low-g, Z-Low-g sensor 86 may be Item No. MXR9150GM available from Memsic Inc. In such an alternative embodiment, the Z-High-g sensor 87 and the X-High-g and Y-High-g sensor 85 may be replaced with an Analog Devices, Inc., Item No. ADXL377. When in an alternative embodiment a single sensor is used to detect and communicate the High-g acceleration readings, such a single sensor is located as near the Low-g sensor 86 as practicable, and—as mentioned—near the missile's center of mass. The CPU 50 may be, for example, part number dsPIC33FJ128MC804 available from Microchip, Inc., or equivalent.

Specifics for the information shown in FIGS. 3-5 is described with sufficient detail that a person skilled in the current art can make and use the present invention. The accelerometers are placed as close as possible to the center of gravity of the head form missile 80 shown in FIGS. 1 and 4. The sensitivities of the various accelerometers used in the apparatus are hereafter disclosed for two similar preferred embodiments. Applicant has tested both embodiments. Testing has shown that both embodiments produce similar results, and that both show a significant improvement over known impact testing devices and processes. Nevertheless, the present method and apparatus is not limited to these specific embodiments. The sensitivities of the sensor accelerometers of two preferred, but not limiting, example offered by way of example are:

Embodiment 1: X- and Y-High-g: ±55 g Z-High-g: −215 g X-, Y- and Z-Low-g: ±16 g
Embodiment 2: X- and Y-High-g: ±55 g Z-High-g: −215 g X-, Y- and Z-Low-g: ±5 g It is observed that the sensitivities are relatively high (i.e., within narrow ranges), and that the accelerometers for measuring acceleration along the Z axis may be devised for measuring negative values (impact decelerations) only. Anti-alias filters 30 are situated at any suitable location and may be mounted upon the board 84. The ASTM F1292-13 standard specifies the frequency response of the anti-aliasing filters. Anti-aliasing filters 30 are utilized in the apparatus to meet the requirements of the ASTM standards; however, in practice the filters 30 are optional because the accelerometers are typically internally band-limited to about 400 Hz. Furthermore, extensive testing on playground surfaces has shown that declaration curves have no measurable frequency content above 50 Hz.

The ASTM F1292-13 standard specifies that all three axes are to be simultaneously sampled and held at a rate of 20,000 samples per second. Accordingly, the method and apparatus comply with this requirement using a sample and hold circuit 40 known in the art. In practice, a sample rate of 10,000 samples per second is more than adequate.

The CPU 50 contains the sample and hold as well as analog-to-digital circuitry required to digitize the accelerometer data, so a separate A/D converter is not required. CPU 50 performs known calculations on the deceleration data collected from the impact test, using methodologies specified in the ASTM F1292-13 document, to determine:

a. The Head Injury Criterion (HIC) score;
b. The peak composite deceleration (consisting of the root-mean-square calculation combination of the accelerations in the X-, Y-, and Z-axes);
c. fall height; and
d. impact angle The composite deceleration curve, along with the above calculations, are stored in the apparatus along with the date and time of the drop test. The calculations of the HIC and peak composite deceleration are then compared (e.g., by the programmed CPU 50) to the appropriate ASTM standards. The apparatus can store, as in the CPU, data from up to 200 separate drop tests.

When the foregoing calculations are complete and the determined HIC and peak decelerations compared to ASTM limits, a simple pass/fail indicator 60 (such as a red light or LED (fail) and green light or LED (pass)) notifies the user if the playground surface complies with the ASTM safety standard by sending a pass-fail signal to the indicator. The current safety requirement is that a drop test from the highest point on the playground equipment down to the surface must produce a peak deceleration impact of less than 200 maximum g-force and a HIC score of less than 1000. Thus, the measured data from a given drop test is compared quantitatively to these numerical standards. The pass/fail indicator 60 light illuminates green if the drop test determines that the playground surface complies with these requirements, or red if either safety limit is exceeded.

After the calculations are complete, the composite deceleration curve, along with the associated calculations described above and the date and time of the test, can be communicated to a conventional display (e.g., LED screen) using either a wired or wireless (e.g., radio, Bluetooth® signal, infrared, and the like) transmission to a conventional digital computing device (desktop, laptop, or tablet computer). This transmission is not necessarily done in "real time," but may be after the measurements and calculations are complete and the missile apparatus 80 transported away from the testing site.

The present apparatus and method obtain improved accuracy and precision by carefully combining the data from at least four accelerometers (as distinguished from the usual one, or three, accelerometers in known devices). Optimized results are obtained in a preferred embodiment of the present invention by exploiting six accelerometers. Preferably, three of the accelerometers (e.g., accelerometers in sensors 85 and 87, or occurring in a single sensor) are sized for "high-g" measurements in each axis (X-, Y-, and Z-axes). Preferably, three additional accelerometers (e.g., in sensor 86) are sized for "low-g" measurements in each axis (X-, Y- and Z-axes). If in an alternative embodiment, only one low-g accelerometer is available, it must be placed to measure acceleration in the Z-axis. In the present apparatus and method, the low-g Z-axis measurement is not used for g-max or HIC calculations; rather, it is used for measuring the fall height, and for improving accuracy by advantageously canceling out bias drift on all accelerometers and/or their associated electronics. (Fall height is the distance the missile 80 falls during a drop test, ordinarily the distance from the testing fall point on the playground (e.g., from the top of a swing set, slide, or "jungle gym" or the like) to the playground surface under test.) Thus, in a preferred embodiment, there is at least one low-g accelerometer (in, for example, a sensor at 86) for measuring low-g acceleration on the Z-axis and at least three high-g accelerometers (e.g., in sensors 85 and 87) for measuring acceleration in the three orthogonal axes; most preferably, low-g acceleration is measured in all three orthogonal axes.

During an impact test, the X-High-g, Y-High-g, and Z-High-g accelerometer data are simultaneously sampled-and-held at a rate of 20 kHz, and stored inside the apparatus system (e.g., the CPU 50). When six accelerometers are used, another data set of the X-Low-g and Y-Low-g accelerometer data, together with the Z-High-g accelerometer data, is also sampled-and-held (also at 20 kHz) and stored. If response for the Low-G accelerometer approaches saturation (the stated measurement limit for the device) for either the X-axis or the Y-axis, the data set from the X-High-g and Y-High-g sensor (e.g., sensor 85), together with data from the Z-High-g sensor (e.g., sensor 87) is utilized in data processing calculations. However and advantageously, if the X-axis and Y-axis acceleration readings are small (substantially under saturation limits for the low-g accelerometers), the X-Low-g and Y-Low-g data output (for example, obtained from sensor 86) is used (e.g., and with data from the Z-High-g sensor 87) because the more sensitive low-g accelerometers can measure small accelerations more accurately than the accelerometers in a "high-g" sensor. On the rare occasions when any of the high-g accelerometers saturate in a drop test, the sensors and CPU of the apparatus indicate that the missile 80 landed too crookedly to yield accurate results; that the drop test should then be repeated.

The careful combination of data from the four (or preferably six) accelerometers results in a more precise measurement than obtained by known devices, because the sensors are more appropriately "sized" (configured) to the actual magnitude of the accelerations realized in each axis. Known devices typically use three accelerometers all sized to measure accelerations of ±500 g, for a total range of 1000 g's in each axis. Consequently, in known devices lower-g accelerations are not measured as precisely as they could be if the devices included lower-g accelerometers.

Because objects always free-fall towards the surface of the earth, it is not necessary for the Z-axis accelerometer to measure positive g forces; only negative g forces need be measured. And because playground surfaces fail at or above 200 g, it is not needed to measure accelerations greater than 250 g. Thus, the Z-axis accelerometer in the present apparatus preferably is sized to measure up to −215 g's (minus 215 g, deceleration), as distinguished from the ±500 g measured in known devices. This results in a theoretical 4× (factor of four) improvement in acceleration measurement precision in the Z-axis in comparison with the sensors of many known devices. (The improvement is by a factor of two if the instrumentation amplifiers in conventional known systems happen to adjust the sensor bias to ignore the positive half).

Because the missiles of impact sensor systems are dropped perpendicularly to the playground surface, most of the impact force is always in the −Z (negative) direction. We have determined that there is no need to measure X-axis or Y-axis accelerations greater than ±50 g (except in rare occasions when the missile lands excessively crooked, in which case the results are discarded and the drop test is repeated). Thus, in the present apparatus and method, accelerations on the X-axis and the Y-axis are measured with a theoretical precision of at 10× greater than that of known devices employing accelerometers measuring ±500 g, and 30× greater if the X- and Y-components of acceleration are small enough to be measured by the Low-g accelerometers of this invention.

Devices based upon the teachings of the patents to Hogan et al., referenced hereinabove, have been offered for sale under the TRIAX® trademark. The calibration certificate that accompanied an impact sensor device sold under the "TRIAX" trademark, indicated that the device's X- and Y-axes are tested at a peak value of 150 g's. Consequently, as a minimum it may be assumed that this known instrumentation amplifiers scale the X and Y axes to at least ±150 g's, indicating the presently disclosed sensor apparatus offers a 3X improvement in precision, in the X- and Y-axes, over the known device.

The data from accelerometers used in micro electro mechanical systems (MEMS), such as the sensors of the present apparatus, often exhibit a small error or offset in the average signal output, even when there is no movement. This is known as sensor bias. Also, the physical properties of such sensors change over time and/or with changes in ambient temperature, which results in different performance characteristics. The accuracy of the present apparatus and method are advantageously improved by using the Z-Low-g accelerometer to auto-calibrate the apparatus against sensor bias drift. The Z-Low-g accelerometer also is used to accurately measure the fall time (and thus to calculate fall height). Actual data from a three-foot drop is shown below in FIGS. 6 and 7, to which reference is invited.

Figure 8:
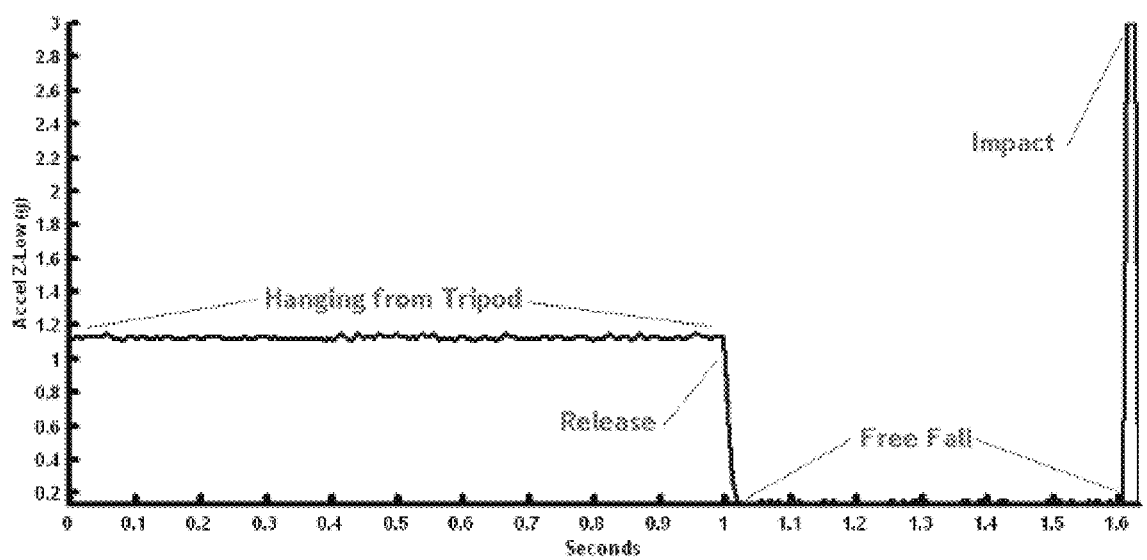
FIG. 8 is a graph of an example data from a low Z-axis accelerometer for a seven-foot drop sample test (with sensor bias) of a Head Form Missile (time in seconds on the domain, acceleration in g's in the range)

Fall time is identified and measured by considering both the magnitude and slope of the Low-g Z-axis acceleration data communicated from the Z-Low-g accelerometer. The present apparatus and method identifies the free fall state by monitoring for an abrupt, sharp, negative slope of significant time duration (e.g., at least 15 milliseconds), followed by a sustained period of near-zero slopes, just prior to impact, as indicated in FIG. 7. During this time of free fall, all accelerometers should normally experience zero gravity, as indicated in the time period of near-zero acceleration seen in FIG. 6. However, because of sensor bias drift, the actual measurement is often non-zero, as suggested by the data of FIG. 8.

The present apparatus and method exploit the free fall state to auto-cancel sensor bias drift by averaging, using normal arithmetic averaging algorithms, the acceleration values output by each accelerometer during the free fall state to precisely measure sensor bias in each accelerometer. During at least a portion of, preferably through-out, the period of the free-fall of the apparatus (from release to impact), while the missile 80 experiences the "zero-gravity condition," the acceleration outputs of each accelerometer are measured, averaged and stored for each accelerometer; the calculated average is the measured sensor bias used to adjustably correct the actual output data from the corresponding accelerometer. Thus, the calculated average is the measured bias for that accelerometer, and an associated bias is calculated for each accelerometer. This measured bias is then subtracted from the actual accelerometer output readings for each respective accelerometer to obtain more accurate acceleration measurements during impact. Because the present method is constantly auto-canceling sensor bias drift, by subtracting the measured bias from the accelerometer output values, the apparatus provides much improved measurement accuracy, compared to devices known in the art.

Notably, the opportunity to auto-cancel sensor bias drift appears unique to drop sensor contexts, because most other accelerometer applications do not have the luxury of taking advantage of the zero-gravity conditions during free fall. As is customary among most scientific instrumentation, known impact sensor devices must be returned to the factory or some other qualified testing facility for a yearly re-calibration traceable to a National Institute of Standards Technology (NIST) standard. However, because drop impact sensors are routinely placed in a precisely zero-gravity environment each time they are dropped, they circumstantially have an ideal opportunity for sensor bias to be auto-calibrated each time they are used—not just once a year when returned to a third party for re-calibration. This auto-calibration as implemented in the present apparatus and method results in significant accuracy improvements when compared to the prior art.

To most fully auto-calibrate a sensor, it is desirable to adjust for both sensor bias drift and for variations in accelerometer gain. The average of the zero-g readings explained herein above corrects for bias drift, while monitoring the accelerometer supply voltage allows for auto-correcting the gain. By constantly adjusting accelerometer gain to correspond to variations in the voltage supply to the accelerometers, accuracy of overall output readings is enhanced. Accordingly, the present apparatus and processes thus further improve accuracy by precisely monitoring accelerometer supply voltage (i.e., from the missile's on-board power source) and executing slight adjustments to the accelerometer gain. The output of the accelerometers is ratio-metric to the cube of the supply voltage. In a preferred embodiment, the power supply for these accelerometers is regulated by a regulating integrated circuit which maintains the supply voltage to within about ±2%. This variation results in a small but significant variation in accelerometer gain. By precisely monitoring the supply voltage, and adjusting the accelerometer gain accordingly, the drop sensor apparatus realizes additional improvements in accuracy.

Figure 9:
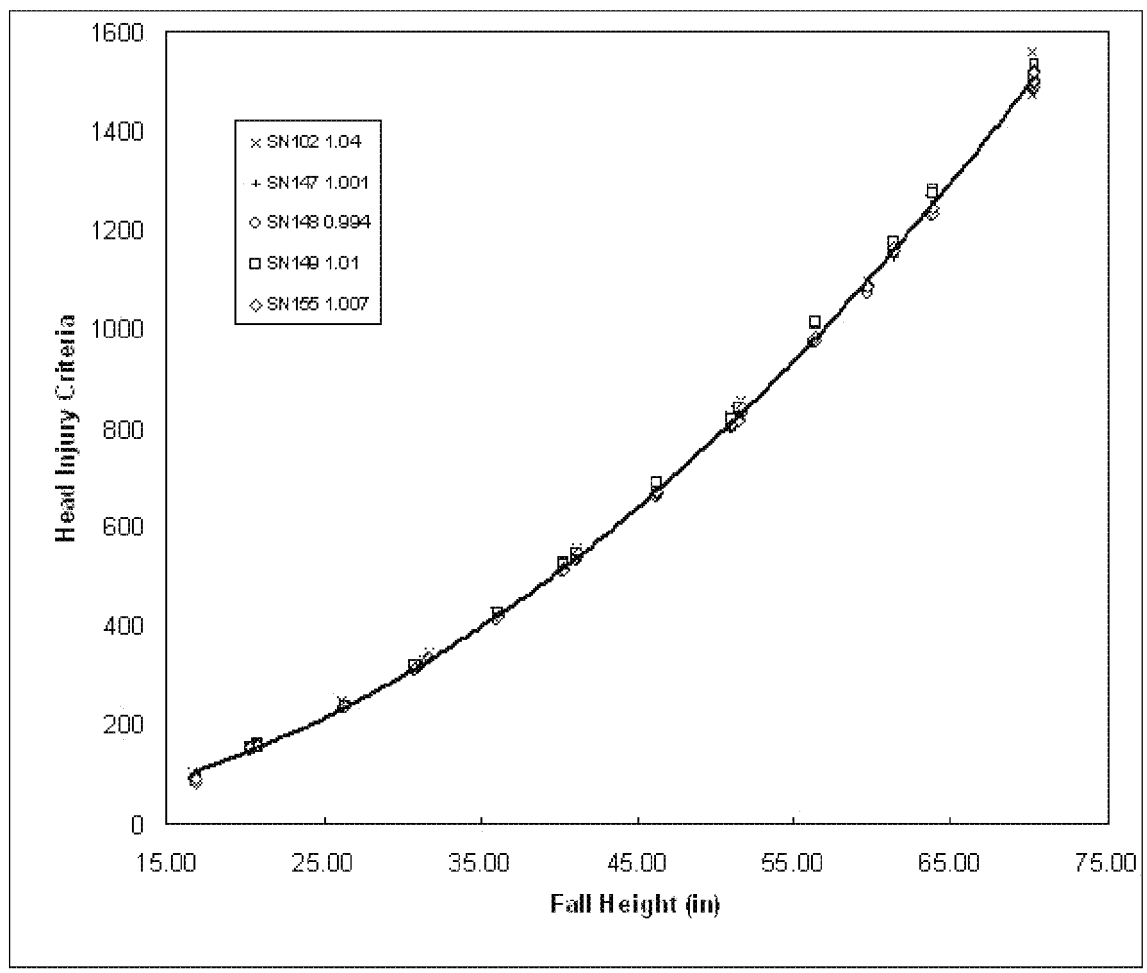
FIG. 9 is a graph of data obtained from an apparatus according to the present invention, plotting drop data for five different sensors over a 42-degree temperature differential (fall height in inches on the domain, Head Injury Criteria in the range)
Figure 10:
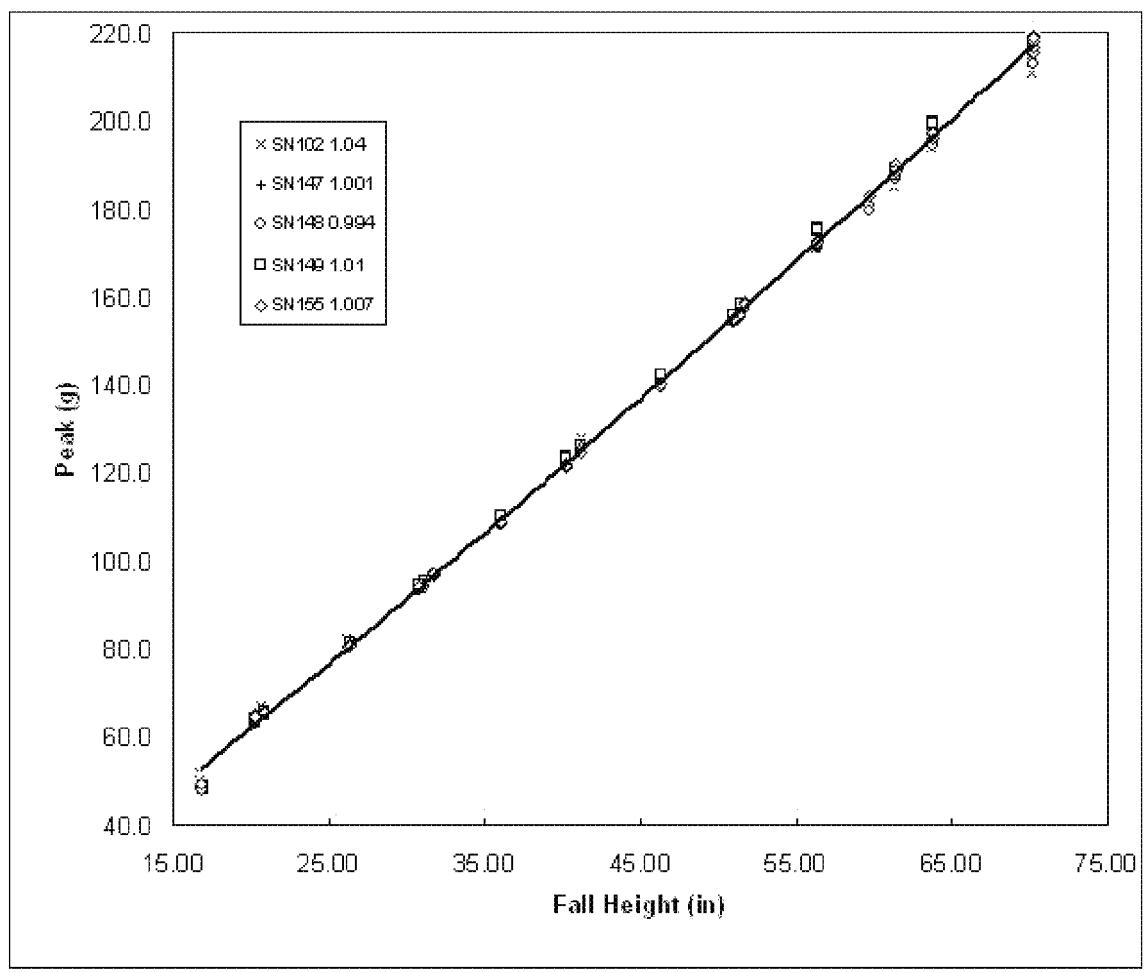
FIG. 10 is a graph of data obtained from an apparatus according to the present invention (that of FIG. 9), plotting drop data for five different sensors over a 42-degree temperature differential (fall height in inches on the domain, peak acceleration in g's in the range)

Extensive comparison testing of the present apparatus to a commercially available TRIAX brand drop impact sensor apparatus has revealed that the accuracy of the commercially available TRIAX impact sensor varies significantly with ambient temperature (and humidity), while the accelerometers used in the present apparatus are temperature compensated. To quantify performance over a wide temperature range, the following data shown in FIGS. 9 and 10 were collected on two consecutive days using five different drop impact sensors according to the present disclosure; the data for both days are plotted in the figures. FIG. 9 plots the measured and calculated Head Injury Criteria as a function of fall height, while FIG. 10 plots the peak acceleration as a function of fall height. The ambient temperature on both days was 69.5° F. On the first day of testing, all five drop impact sensors were at the same temperature as the room where the tests were conducted. On the second day of testing, one of the sensors (SN102) was heated overnight to 90° F., while three others were cooled overnight to 48° F. to produce a temperature differential of 42° F. between sensors. As illustrated in FIGS. 9-10, there is no quantifiable difference between the data neither from the test conducted with the sensors at ambient temperature nor from the tests conducted with hot and cold sensors. The calibration scale factors for all five sensors are also shown in FIGS. 9-10.

Figure 11:
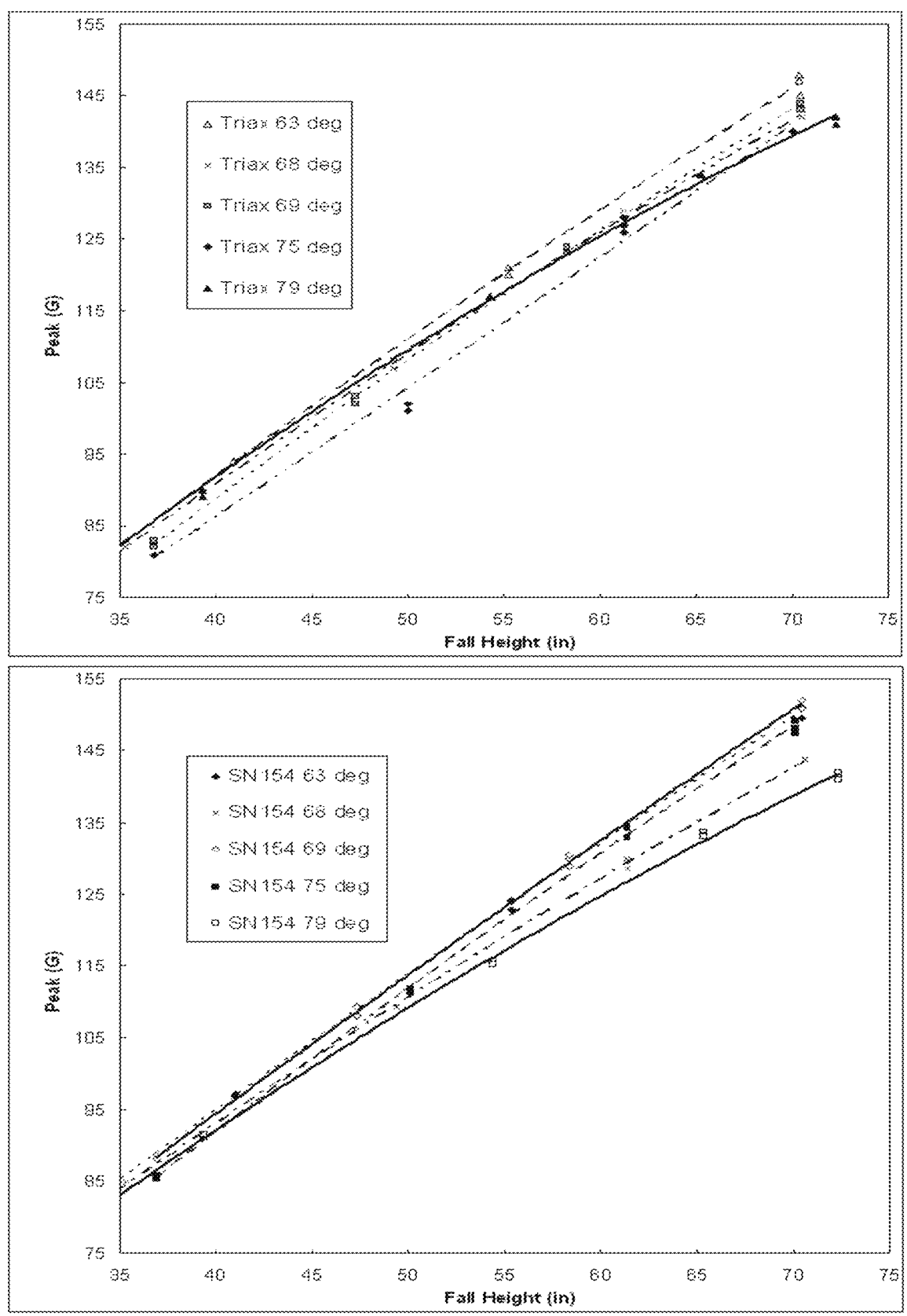
FIG. 11 is a pair of graphs comparing drop test data obtained from a known impact testing device (top graph) and from an impact testing apparatus according to the present invention (bottom graph) for five different ambient conditions (fall height in inches on the domains, peak acceleration in g's in the ranges)

Reference is turned to FIG. 11, visually comparing data obtained from an impact testing apparatus (bottom graph) according to the present disclosure to data obtained from a TRIAX brand device (top graph) from the known art. The data for FIG. 11 were collected on five different days with varying ambient temperatures and humidity. The testing surface and respective impact testing devices were always stored in the same room, so they were at the same temperature at the time of each test. The top half of FIG. 11 shows the TRIAX device data for all five days while the bottom half of the figure shows the apparatus data obtained from the presently disclosed apparatus at the same time as the TRIAX device data. Comparison of the two plots facilitates several observations.

It is expected that the testing results would change with temperature (and humidity) because the testing surface materials would naturally become softer at higher temperatures and harder at cooler temperatures. But upon comparing the TRIAX device data to the present apparatus data of FIG. 11, it is evident that the measured surface attenuation variation due to various ambient conditions are more orderly in the data obtained from the present apparatus than from the TRIAX device. It is noted that the data trend lines obtained from the present apparatus do not cross each other as radically as they do with the TRIAX device data.

It also is noted that the apparatus data trend lines yielded by the present apparatus converge at lower fall heights, while the trend lines from the TRIAX device do not converge. The forgoing verifies that the present apparatus generates more accurate impact data than does the TRIAX device, especially at lower-g levels. This is due at least in part to the fact that the TRIAX device accelerometers have a much larger range than necessary for testing "safe" playground surfaces. The presently disclosed apparatus saturates with max-g accelerations greater than 250 g's, so a TRIAX device would be needed to test much harder (less safe) surfaces; but because dangerously hard surfaces are undesirable in "safe" playgrounds, the accelerometers used in the presently disclosed apparatus are more suitably sized for testing the safety of playground surfaces.

There also is observed in the graphs of FIG. 11 significantly more "scatter" in the TRIAX device data, compared to the data obtained from the present apparatus. This difference in scatter indicates that the presently disclosed apparatus also is more precise than the known device.

Figure 12:
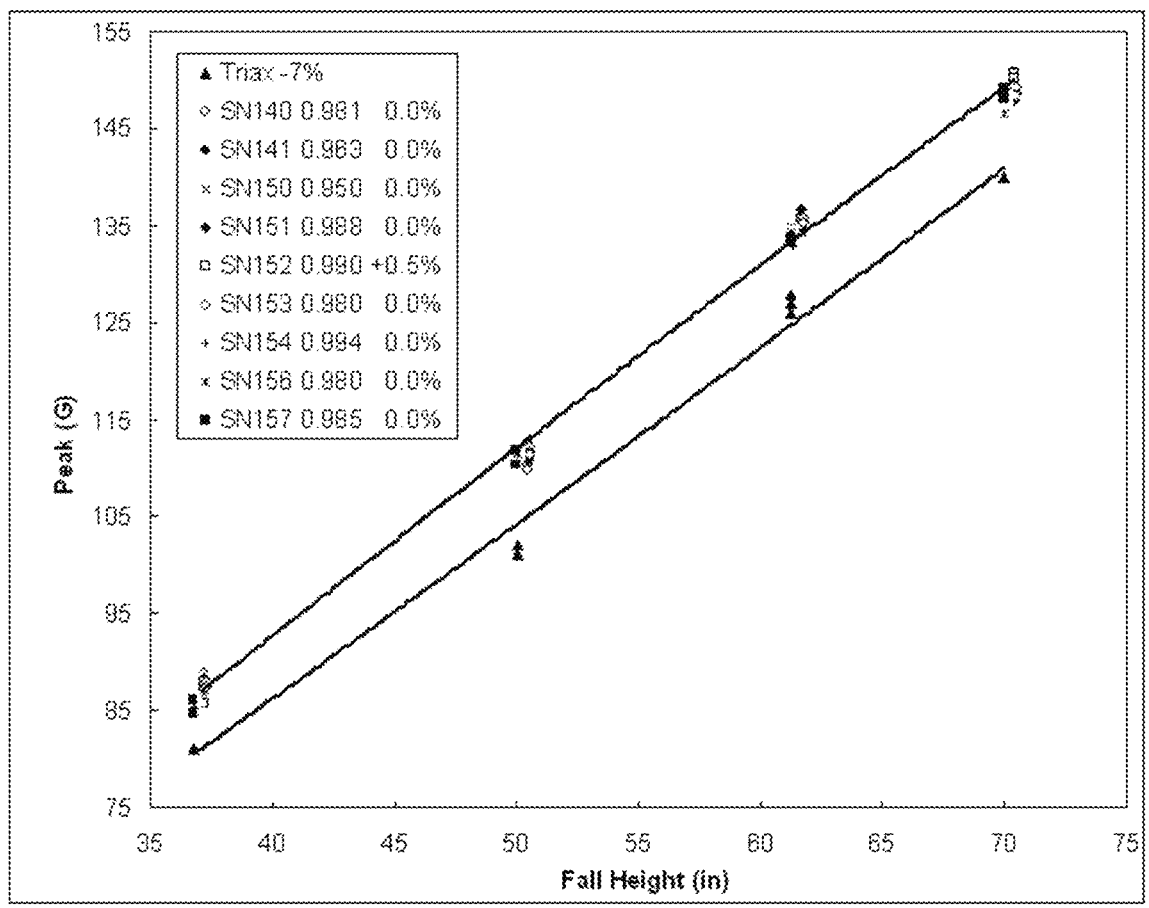
FIG. 12 is a graph contrasting drop test data obtained at 75° F. from an impact testing apparatus according to the present invention (upper collection of plots) and from a known device (lower-most plot).

FIG. 12 further documents that the present apparatus is accurate to less than 1%. FIG. 12 shows in greater detail the same data that was collected to plot FIG. 11. In the figure, several data sets obtained from the present apparatus are plotted along with TRIAX device data collected at the same time. It is observed that the accelerometer sensors from the disclosed apparatuses are well within the 1% accuracy (when compared to the indicated standard sensor SN154), while the data generated by the TRIAX device is not. The calibration factors, as well as the percent deviation from the standard accuracy, are listed for each sensor in FIG. 12.

The presently disclosed method and apparatus is equally applicable for testing the safety of sporting facilities such as soccer and football fields, or any other surface designed to lessen the impact from falls. The apparatus and method achieve a significant improvement in both accuracy and precision over the state of the art drop sensors, by advantageously implementing at least the following concepts:

1. Using accelerometers with a National Institute of Standards and Technology (NIST) traceable calibration, that are sized for lower g-forces appropriate for playground surfaces, ensures a more accurate measurement.
2. Concept (1) may be enabled by using an electromagnet or handle to ensure that the device is typically dropped perpendicularly to the playground surface. This allows the NIST-traceable calibration accelerometers to be sized for lower accelerations, thus rendering a more accurate reading when compared to prior art drop impact sensor systems. (The U.S. Pat. No. 9,568,407 to Pittam, for example, states that the device can be dropped in any orientation—which requires that the accelerometers for all three orthogonal directions be equally sized to measure at least ±215 g's.)
3. The combination of NIST traceable calibration, together with the zero-gravity auto-calibration technique hereby disclosed, makes the present drop impact sensor apparatus and method much more precise than the state of the art by eliminating the effect of sensor bias drift, and significantly reduce the need for periodic re-calibration.

While the foregoing written description of the improved drop impact sensor apparatus and method enables one of ordinary skill to make and use this invention, those of ordinary skill will understand and appreciate the existence of variations, combinations, and equivalents of the specific embodiments, methods and examples herein. The invention should therefore not be limited by the above described embodiments, methods, and examples, but by all embodiments and methods within the scope and spirit of the disclosure; other embodiments can achieve the same results. While the invention has been described in relation to a preferred embodiment thereof shown in the accompanying drawings, it also is to be recognized that the same is readily susceptible to modification, variation and substitution of equivalents without avoiding the invention. The system and apparatus are not intended to be limited by the foregoing except as may appear in the following appended claims, and it is intended to cover in the claims all such modifications and equivalents.

I claim:

1. A method for evaluating the impact attenuation of a playground surface, comprising:
dropping in a free fall to the ground's surface a head form missile comprising a housing;
measuring with a high-g accelerometer in the housing the acceleration of the missile in an X-axis;
measuring with a high-g accelerometer in the housing the acceleration of the missile in a Y-axis;
measuring with a high-g accelerometer in the housing the acceleration of the missile in a Z-axis;
measuring with a low-g accelerometer in the housing the acceleration of the missile in an X-axis;
measuring with a low-g accelerometer in the housing the acceleration of the missile in a Y-axis;
measuring with a low-g accelerometer in the housing the acceleration of the missile in the Z-axis;
simultaneously sampling, holding, and storing acceleration data output from the accelerometers;
auto-cancelling sensor bias drift by:
averaging acceleration values output by each accelerometer during the free fall state to obtain a measured bias for each accelerometer; and
subtracting the measured bias from the accelerometer data output for each respective accelerometer;

processing in a central processing unit the acceleration data; and observing an indication from a pass-fail indicator.

2. The method of claim 1 wherein measuring with a high-g accelerometer the acceleration of the missile in a Z-axis comprises measuring with an accelerometer sized to measure up to 215 g.

3. The method of claim 1 wherein processing the acceleration data comprises:

determining, using root-mean-square calculation, a peak composite deceleration;

comparing the peak composite deceleration to an ASTM standard; and sending a pass-fail signal to the indicator.

4. The method of claim 1 wherein processing the acceleration data comprises:

determining the Head Injury Criterion Score;

comparing the Head Injury Criterion Score to an ASTM standard; and sending a pass-fail signal to the indicator.

5. The method of claim 1 wherein the output of the accelerometers is ratio-metric to the cube of accelerator supply voltage, and further comprising:

monitoring an accelerometer supply voltage;

regulating the supply voltage within a range of approximately ±2%;

adjusting accelerometer gain to correspond to variations in the voltage.

6. The method of claim 1 further comprising:

measuring with a low-g accelerometer in the housing the acceleration of the missile in an X-axis; and measuring with a low-g accelerometer in the housing the acceleration of the missile in a Y-axis.

7. The method of claim 6 wherein when data output from the low-g accelerometer for measuring acceleration in the X-axis, or from the low-g accelerometer for measuring acceleration in the Y-axis, approaches their respective saturation levels, the step of processing the acceleration data comprises processing the data output from the high-g accelerometers for measuring acceleration in the X-axis and the Y-axis and the Z-axis.

8. The method of claim 6 wherein when data output from the low-g accelerometer for measuring acceleration in the X axis, and from the low-g accelerometer for measuring acceleration in the Y axis, is less than their respective saturation levels, the step of processing the acceleration data comprises processing the data output from the low-g accelerometers for measuring acceleration in the X-axis and the Y-axis, and from the high-g accelerometer for measuring acceleration in the Z-axis.

9. The method of claim 1 wherein processing the acceleration data comprises measuring a fall time by evaluating magnitudes and slopes of acceleration-versus-time data output from the low-g accelerometer for measuring acceleration in the Z-axis.

10. The method of claim 9 wherein measuring fall time comprises monitoring the acceleration-versus-time data, output from the low-g accelerometer for measuring acceleration in the Z-axis, for an abrupt increase in negative slope of significant time duration followed by a sustained period of near-zero slopes.

11. An apparatus for evaluating the impact attenuation of a playground surface, comprising:

a head form missile comprising a housing configured to be dropped in a free fall to the playground surface;

a high-g accelerometer in the housing for measuring acceleration in an X-axis;

a high-g accelerometer in the housing for measuring acceleration in a Y-axis;

a high-g accelerometer in the housing for measuring acceleration in a Z-axis;

a low-g accelerometer in the housing for measuring acceleration in the Z-axis;

a sample and hold circuit for simultaneously sampling and holding data outputs from the accelerometers;

a central processing unit for processing the data outputs and for auto-cancelling sensor bias drift by averaging acceleration values output by each accelerometer during the free fall state to obtain a measured bias for each accelerometer, and subtracting the measured bias from the accelerometer data output for each respective accelerometer; and a pass-fail indicator.

12. The apparatus of claim 11 further comprising:

a low-g accelerometer in the housing for measuring the acceleration of the missile in an X axis; and a low-g accelerometer in the housing for measuring the acceleration of the missile in a Y axis.

13. The apparatus of claim 12 wherein when data output from the low-g accelerometer for measuring acceleration in the X axis, or from the low-g accelerometer for measuring acceleration in the Y axis, approaches their respective saturation levels, the central processing unit processes the data output, from the high-g accelerometers, to measure acceleration in the X-axis and the Y-axis and the Z axis.

14. The apparatus of claim 12 wherein when data output from the low-g accelerometer for measuring acceleration in the X axis, and from the low-g accelerometer for measuring acceleration in the Y axis, is less than their respective saturation levels, the central processing unit processes the data output from the low-g accelerometers to measure acceleration in the X-axis and the Y-axis, and from the high-g accelerometer to measure acceleration in the Z axis.

* * * * *